United States Patent [19]
Bangert et al.

[11] 3,747,651
[45] July 24, 1973

[54] SELF-PROPELLING VEHICLE WITH TREE-FELLING SHEARS

[75] Inventors: Hans Bangert; Werner Arenz, both of Sprockhovel, Germany

[73] Assignee: Orenstein & Koppel Aktiengesellschaft, Berlin, Germany

[22] Filed: Apr. 17, 1972

[21] Appl. No.: 244,548

[30] Foreign Application Priority Data
Apr. 17, 1971  Germany.................. P 21 18 734.8
June 4, 1971  Germany.................. P 21 27 694.8

[52] U.S. Cl. .......................... 144/34 A, 144/34 R
[51] Int. Cl............................................. A01g 23/08
[58] Field of Search ............... 144/34 R, 34 A, 34 E

[56] References Cited
UNITED STATES PATENTS
3,230,988  1/1966  Dixon................................ 144/34 E

*Primary Examiner*—Gerald A. Dost
*Attorney*—Walter Becker

[57] ABSTRACT

A self-propelled vehicle in which the front portion that is pivotable about a vertical axis relative to the rear portion of the vehicle carries tree felling shears with the cutting edge of the cutting blade extending substantially at a right angle to the driving direction of the vehicle. The housing for the felling shears supports a connecting assembly which pivotally supports a thrust member that is hydraulically pivotable in a plane extending in the longitudinal direction of the vehicle for exerting a pre-load on the tree to be felled.

6 Claims, 6 Drawing Figures

3,747,651
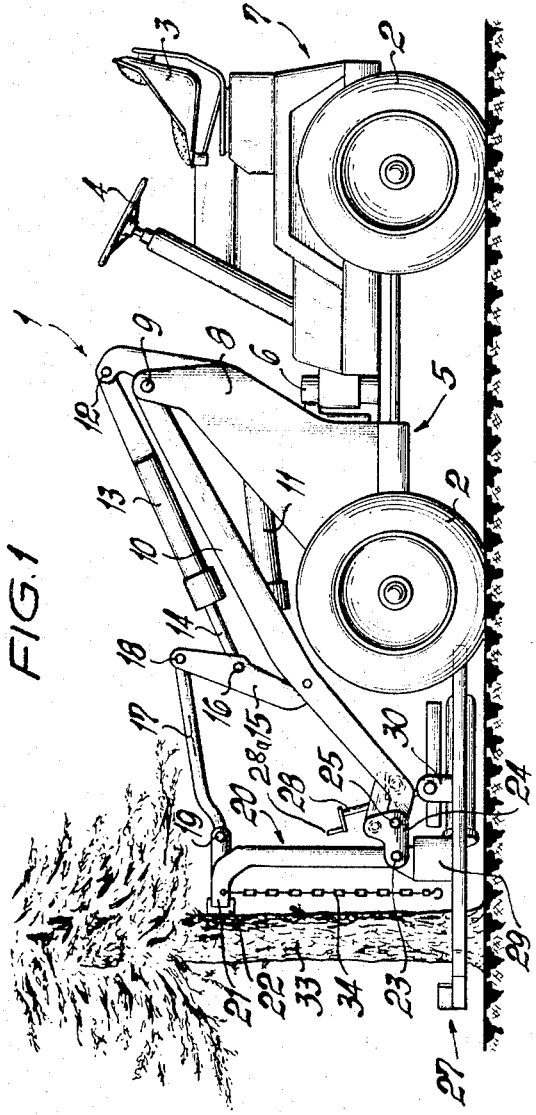
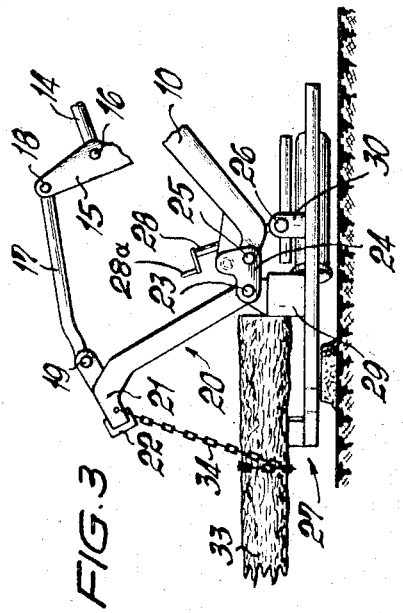
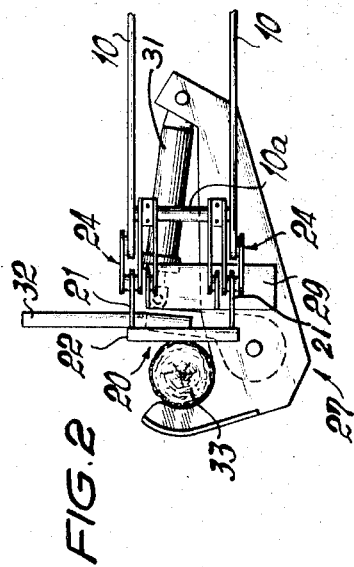

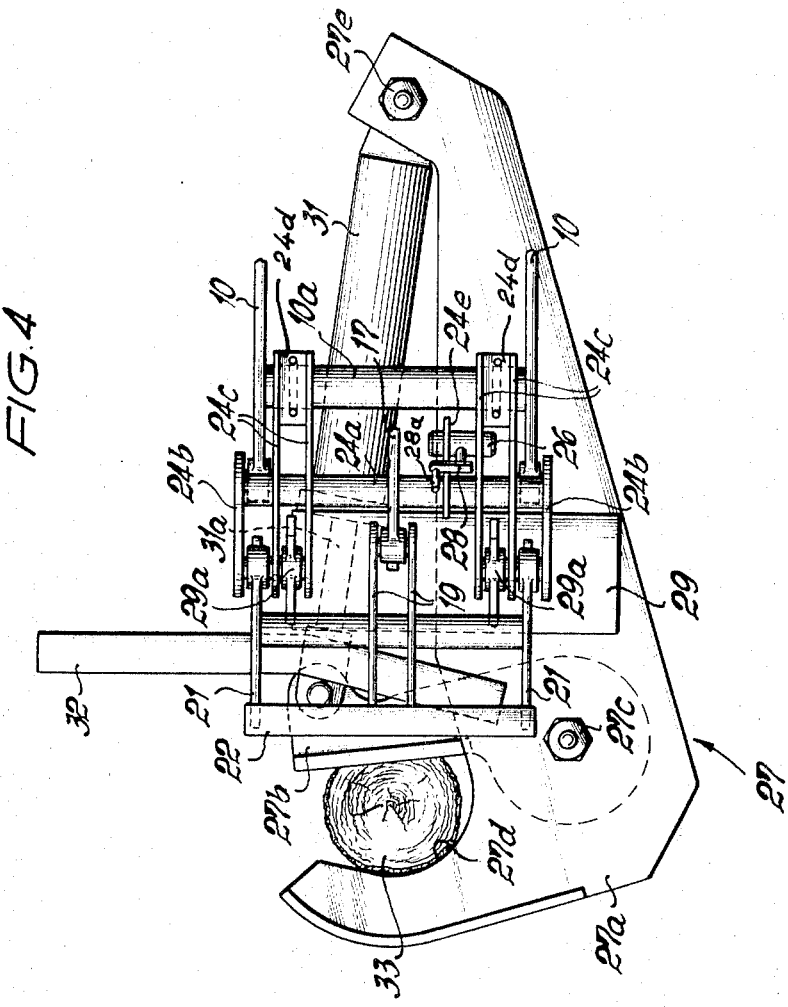

SELF-PROPELLING VEHICLE WITH TREE-FELLING SHEARS

The present invention relates to a self-propelled vehicle which has a hydraulically operable lifting and tilting device and also has a supporting arm while the steering of the vehicle is effected by pivoting the front portion of the vehicle about a vertical axis relative to the rear portion of the vehicle, hydraulically operable tree felling shears being arranged slightly above the ground at the front end of the vehicle.

It is known to mount a pair of tree felling shears on the lifting frame of wheel equipped loaders or tracklaying loaders and to use such tree felling shears for felling trees in woods. It is furthermore known to equip heavy special vehicles with built-in shears having holding means for the tree trunks to be felled, by means of which the tree is held during the cutting operation and can be transported in vertical position. With these devices, the trunk may split to a considerable length in view of the displacement of the fibers caused by the wedge effect of the blades of the shears with the result that a considerable portion of the tree becomes nonusable for the intended purposes.

Furthermore, with heretofore known devices the tree is felled so that it will lie transverse to the driving direction of the vehicle. Furthermore, the direction in which the tree is felled may be determined by the effect of the blades and cannot be precisely determined. Aside from the fact that the heretofore known special vehicles are rather expensive and that the felled trees are frequently damaged, forestering long rows can, as a rule, not be carried out with heretofore known devices without damaging adjacent tree trunks.

It is, therefore, an object of the present invention so to modify heretofore customary vehicles for hydraulic actuation of tools that it will be possible by such modified devices to fell trees not only free from damage, but also so that they will fall in a direction which substantially coincides with the longitudinal extension of the vehicle.

It is another object of this invention to provide a device as set forth above by means of which the felled tree will safely be grasped while making use of the hydraulic system with which the vehicle is equipped anyhow.

These and other objects and advantages of the invention will appear more clearly from the following specification, in connection with the accompanying drawings, in which:

FIG. 1 is a side view of a vehicle according to the present invention.

FIG. 2 represents a top view of the tree-felling shears and mounting thereof at the front end of the supporting arm.

FIG. 3 is a side view of a pressure support with a chain for pulling felled tree trunks away.

FIG. 4 is a top view similar to that of FIG. 2, but on a considerably larger scale.

Figure 5:
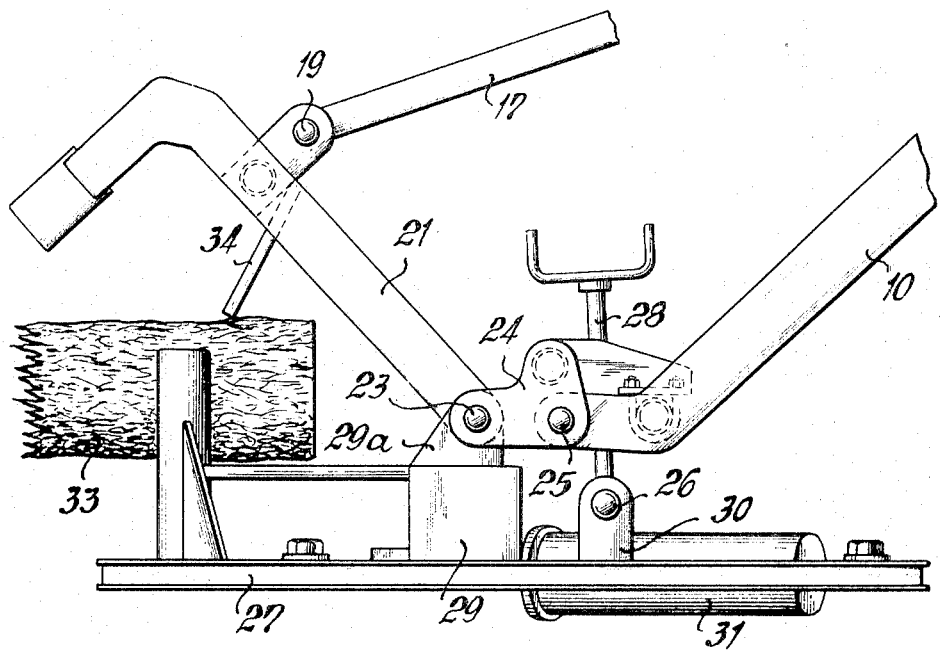
FIG. 5 is a side view of a tree-cutting device provided with a modified tree-transporting device according to the invention.

The self-propelling vehicle according to the present invention is characterized primarily in that the cutting blade of the tree felling shears with its cutting edge is arranged substantially at a right angle to the driving direction of the vehicle, and is furthermore characterized by a hydraulically operable pressure support which is journaled for pivoting about horizontal bolts extending transverse to the driving direction of the vehicle and which is located in a receiving support that is firmly connected to the free ends of a supporting arm, the pressure support being hydraulically pivotable in the direction of the longitudinal axis of the front portion of the vehicle by means of a tiltable cylinder linked to a support, by a rocker linked by said supporting arm, and a connecting rod which connects the free end of the rocker with the free end of the pressure support.

According to a further development of the invention, a vertically standing receiving member is fixedly arranged on the pressure support which receiving member points at an incline downwardly and on the housing of the shears is provided with an obtuse cutout.

Referring now to the drawings in detail, a customary vehicle 1 equipped with a four-wheel drive and normally used on building sites is illustrated in FIG. 1. This vehicle is equipped with rubber tires 2 and is adapted from the seat 3 to be steered by means of a steering wheel 4 and a hydrostatic steering mechanism. The vehicle comprises a front portion 5 which is adapted about the axis of pivot 6 to be pivoted relative to the rear vehicle portion 7 so that the vehicle can turn along a circle with a very short diameter. The vehicle furthermore comprises a support 8 to which supporting arms 10 are pivotally connected by pivots 9. By means of the lifting cylinder 11 the supporting arms 10 can be lifted and lowered. The support 8 furthermore comprises a pivot 12 to which a tiltable cylinder 13 is linked. The connecting rod 14 has a piston connected thereto which is reciprocable in the cylinder 13 while the piston rod 14 has its outer end pivotally connected to the rocker arm 15 at the pivot point 16. Pivotally connected to the free end at the pivot 18 in the rocker 15 is one end of the connecting bar 17, whereas the other end of connecting bar 17 is pivotally connected at 19 to the pressure support 20. Pressure support 20 comprises two arms 21 which are firmly interconnected by a horizontally extending pressure member 22. Support 20 is pivotally journaled at the pivot point 23 of the receiving support 24. Support 24 is at the free ends of the supporting arm 10 detachably connected to the bolt 25. Support 24 comprises a connecting pipe 24a which connects the bearing plates 24b and 24c to each other and also comprises plates 24d which rest on the transverse bolt 10a of the supporting arm 10 while being connected thereto by screw connections. Bolt 26 which is rotatably journaled in one of the plates 24c is provided with a threaded bore extending transversely with regard to its longitudinal axis. The threaded bore receives a spindle 28 for adjusting the shears 24 and is provided with a crank 28a. Welded to the shears 27 is a support 29 which is provided with the two bearing areas 29a. Rotatably journaled on the shears 27 in the support 30 (FIG. 1) is a counternut (not shown) for the spindle 28. Shears 27 are arranged in the housing 27a in which the cutting blade 27b is pivotally journaled in the bearing 27c. The edge 27d serves as counterbearing for the movable cutting blade 27b of the shears 27. This blade 27b is adapted to be actuated by a hydraulic cylinder piston system 31 which is movably journaled in the bearing point 27e of the housing 27a. Connecting rod 31e of the hydraulic cylinder piston system 31 engages the free end of the movable cutting blade 27b. An abutment or bumper 32 is welded to the housing 27a.

OPERATION

The driver drives his vehicle 1 against the tree 33 to be felled until the vehicle by means of its abutment or bumper 32 engages the tree 33. The driver then stops his vehicle by means of a hand brake and actuates the steering wheel 4 in such a way that the front portion of the vehicle pivots toward the tree 33 until the shears 27 has its opening in engagement with the tree. By actuation of the cylinder 13, the pressure support 20 with the pressure member 22 is pressed against the tree so that the tree will be under a preload directed in the felling direction, and so that the edge 27d engages the tree 33. By actuation of the hydraulic cylinder piston system 31, 31a, the cutting blade 27b is pressed against the tree so as to cut thorugh the tree which is under preload. Due to the fact that the fibers of the tree are subjected to pulling stresses, the cutting operation is facilitated. In order to make sure that the cut will also in sloping terrain be effected at a right angle with regard to the tree trunk, the shears 27 are correspondingly adjusted by the spindle 28. After the tree has been felled, it can be removed by the vehicle. To this end, the pressure support 20 is lowered in driving direction, and the chain 34 which is connected to the arms 21 is looped around the trunk of tree 33. After hydraulically lifting the pressure support 20, the tree can be pulled away.

Figure 6:
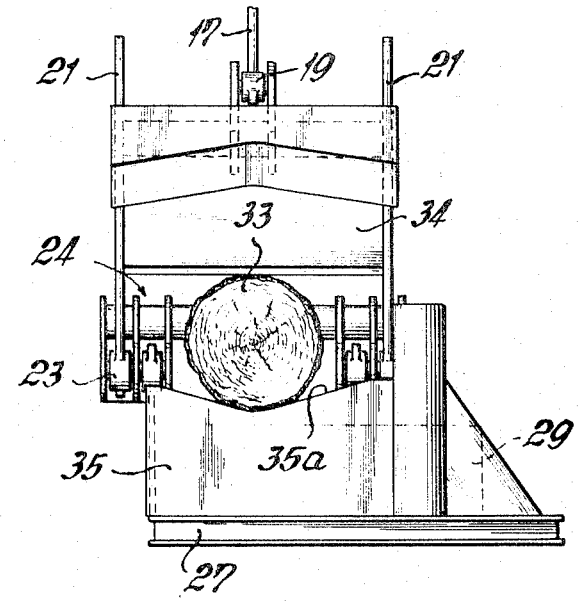
FIG. 6 is a front view of the tree-felling device of FIG. 5 showing a tree in clamped-in condition ready to be pulled away.

Another embodiment of the device according to the invention is illustrated in FIGS. 5 and 6. According to this embodiment a receiving support 24 is pivotally journaled at the pivot point 25. The support 24 has an additional pivot point 23. The pivot point 23 serves for journaling the tree felling shears 27 by means of the support 29 which latter is provided with the two bearing means 29a.

In order to make sure that a vertical cut can be obtained even when the vehicle is standing on a slope, the shears 27 are by means of the threaded spindle 28 which is provided with a handle 28a inclinable relative to the horizontal plane, said spindle 28 being pivotally connected to the support 29 at the pivot 26. The nonvisible cutting blade of shears 27 is actuated by means of the hydraulic cylinder piston system 31, 31a. In addition to the shears 27, also the pressure support 21 is pivotally supported by the support portions 29a and pivots 23. The support 21 is adapted by means of a nonillustrated hydraulic cylinder system linked to the vehicle to be pivoted through the intervention of the connecting rod 17 which is pivotally connected at the pivot 19 to the support 21. Support 21 serves on one hand to press the tree into the direction indicated by the position of the vehicle after the tree has been cut off by means of the shears 27. On the other hand, after the tree 33 has been laid down in the manner described above the support 21 serves for pressing the tree upon the receiving member 35 by means of the pressure element 34 which is connected to the support 21 and points downwardly so firmly that the felled tree 33 will be held so firmly that it can be pulled away by the vehicle.

As will be evident from the above, the advantages obtained by a device according to the present invention consist primarily in that the danger of accidents which heretofore was present since with heretofore known devices the direction in which the tree would fall was uncertain, has been greatly reduced. Furthermore, line forestering can be effected without difficulties so that only individual rows of trees will be felled.

It is, of course, to be understood that the present invention is, by no means, limited to the specific showing in the drawings, but also comprises any modifications within the scope of the appended claims.

What we claim is:

1. A self-propelled vehicle having a rear portion and a front portion pivotable about a vertical axis relative to said rear portion for steering said vehicle, housing means supported by said front portion, tree felling shear means arranged in said housing means and having a cutting blade pivotably mounted in said housing means and provided with a cutting edge extending substantially at a right angle with regard to the driving direction of said vehicle, mounting means connected to said housing means, connecting link means linked to said mounting means, thrust means having one end portion pivotally connected to said connecting means for pivoting about an axis substantially transverse to the longitudinal axis of the vehicle and being operable selectively to exert a pre-loading pressure upon the tree to be felled, supporting means mounted on said front portion, supporting arm means having one end portion linked to said supporting means and having the other end portion normally fixedly but detachably connected to said connecting link means, and means including fluid operable cylinder-piston means supported by said front portion and linked to said thrust means for selectively pivoting the same in the longitudinal direction of the vehicle.

2. A vehicle according to claim 1, in which said means supported by said front portion and linked to said thrust means include rocker arm means linked to said supporting arm means and also include connecting rod means connecting said rocker arm means to said thrust means.

3. A vehicle according to claim 1, which includes abutment means connected to said housing means and extending in a direction transverse to the driving direction of the vehicle for abutment against the tree to be felled.

4. A vehicle according to claim 1, which includes chaim means connected to that end portion of said thrust means which is remote from said connecting means.

5. A vehicle according to claim 1, in which said housing means with said shear means is pivotable about a horizontal axis, and which includes spindle means for pivoting said housing means about said horizontal axis to move said shear means into a plane substantially perpendicular to the longitudinal axis of the tree trunk to be felled.

6. A vehicle according to claim 1, which includes a receiving member having an obtused angled cutout for receiving the felled tree trunk, and holding down means connected to and protruding downwardly from said thrust means at an angle thereto for pressing against a tree trunk in said receiving member and holding said trunk therein.

* * * * *